US006175428B1

(12) United States Patent
On et al.

(10) Patent No.: US 6,175,428 B1
(45) Date of Patent: Jan. 16, 2001

(54) DEVIATION CORRECTING SYSTEM FOR SCANNER

(75) Inventors: Jae-Gyoung On, Seoul; Hae-Chul Kim, Suwon-si, both of (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/083,080

(22) Filed: May 22, 1998

(30) Foreign Application Priority Data

May 22, 1997 (KR) .................................................. 97-19893
Dec. 19, 1997 (KR) .................................................. 97-70905

(51) Int. Cl.[7] ...................................................... H04N 1/00
(52) U.S. Cl. ........................... 358/406; 358/1.1; 358/448; 358/504; 399/72
(58) Field of Search ................................... 358/406, 448, 358/454, 456, 463, 474, 482, 504, 1.1, 1.15; 399/65, 67, 72, 144

(56) References Cited

U.S. PATENT DOCUMENTS

| 4,384,337 | 5/1983 | Mamberer et al. ................. 358/1.14 |
| 5,011,413 | 4/1991 | Ferris et al. ........................... 434/358 |
| 5,144,448 | * 9/1992 | Hornbaker, III et al. ............ 358/482 |
| 5,231,663 | 7/1993 | Earl et al. ............................... 380/18 |
| 5,270,774 | 12/1993 | Kikuchi ................................... 399/8 |
| 5,408,543 | 4/1995 | Yoshida ................................ 382/317 |
| 5,500,746 | * 3/1996 | Aida ...................................... 358/504 |
| 5,546,165 | 8/1996 | Rushing et al. ....................... 399/78 |
| 5,706,409 | 1/1998 | Yeh et al. ............................... 358/1.6 |
| 5,715,105 | 2/1998 | Katayama et al. .................... 360/48 |
| 5,745,658 | 4/1998 | Gerety ................................... 358/1.2 |
| 5,978,506 | * 11/1999 | Murayama et al. ................. 382/162 |

\* cited by examiner

Primary Examiner—Edward L. Coles
Assistant Examiner—Mark Wallerson
(74) Attorney, Agent, or Firm—Robert E. Bushnell, Esq.

(57) ABSTRACT

A deviation correcting system for a scanner including a central processing unit producing a control signal for reading out a correcting program for correcting a scanning deviation, and a test pattern, for printing the test pattern, for scanning the printed test pattern, and then for correcting a scanning deviation; a print driver producing a control signal for printing the test pattern produced from the central processing unit, feeding the test pattern back to a scanning position; a printing unit printing the test pattern and then feeding the test pattern back to the scanning position upon application of the control signal from the print driver; an image processing unit producing a control signal for scanning the test pattern upon application of the control signal from the central processing unit; and a shuttle scanner module scanning the test pattern and producing image data upon application of the control signal from the image processing unit.

20 Claims, 7 Drawing Sheets

![Figure 7 grid]

DEVIATION CORRECTING SYSTEM FOR SCANNER

CLAIM OF PRIORITY

This application makes reference to, incorporates the same herein, and claims all benefits accruing under 35 U.S.C. §119 from our patent applications for DEVIATION CORRECTING SYSTEM FOR SCANNER earlier filed in the Korean Industrial Property Office on May 22, 1997 and there duly assigned Ser. No. 19893/1997, and for DEVIATION CORRECTING SYSTEM FOR SCANNER earlier filed in the Korean Industrial Property Office on Dec. 19, 1997 and there duly assigned Ser. No. 70905/1997.

BACKGROUND OF THE INVENTION

1. Field of the Invention

The present invention relates to a deviation correcting system and process for detecting scanning deviation during operation of scanners and, more particularly, to a process and system for correcting deviation during scanning in a scanner being operated in a multi-tasking system, by controlling the number of slices to correct deviation of scanned data.

2. Discussion of Related Art

Multimedia systems that are driven to present combinations of moving and still pictures, sound, music and words, are pervasive in the industrialized world, especially in computers or in other entertainment appliances. Concurrent with the development of a multimedia computer systems, peripheral equipment including image formation equipment such as printers, have been incrementally modified to provide various functions. A multi-tasking system, employing an ink-jet mechanism and serving as a facsimile and scanner, will typically be coupled to an external personal computer that performs a user-selected program and generates print data. The multi-tasking system will typically either receive data from the personal computer or scan data printed on the exposed surface of one or more documents. Conventional multi-tasking systems include a scanner such as a laser flatbed or sheetfed scanner, for reading information borne by a document by scanning the document. With a sheetfed laser scanner, the scanner remains in a fixed state while the document bearing the information is moved in a vertical direction during laser scanning of its exposed surface. With a flatbed laser scanner, a laser beam is swept across a flat plate by the scanner modulated by video signals from a similar reading system or by digital signals generated by a computer.

Exemplars of recent efforts in the art include U.S. Pat. No. 4,384,337 to Mamberer et al., entitled Zonal Ink Distribution Measuring Method And System, U.S. Pat. No. 5,011,413 to Ferris et al., entitled Machine-Interpretable Figural Response Testing, U.S. Pat. No. 5,231,663 to Earl et al., entitled Image Processing System, U.S. Pat. No. 5,270,774 to Kikuchi, entitled Testing Device For Electrophotographic Imaging Apparatus, U.S. Pat. No. 5,408,543 to Yoshida, entitled Digital Data Reader Of Digital Data Recording Sheet, U.S. Pat. No. 5,546,165 to Rushing et al., entitled Scanner As Test Print Densitometer For Compensating Overall Process Drift And Nonuniformity, U.S. Pat. No. 5,706,409 to Yeh et al., entitled Image Shifting System For Use In A Document Processing System, U.S. Pat. No. 5,715,105 to Katayama et al., entitled Method Of And Apparatus For Recording On And Reproducing From Disk-Type Recording Medium Having Recording Tracks With Sectors Each Having An ID Area And A Data Area, and U.S. Pat. No. 5,745,658 to Gerety, entitled Method Of Aligning One Dimensional Or Two Dimensional Codes To Printer Pixels.

The size of the multi-tasking system is increased by the addition of a sheetfed laser scanner. With the sheetfed laser scanners in common use, the scanning speed drops during continuous scanning. There have been proposals in the art for a shuttle scanner module. That is, the shuttle scanner module is mounted on one side of an ink-jet print head for an ink-jet printer, thus reducing the overall size of the multi-tasking system. The shuttle scanner module scans the document containing the information by dividing the text borne by the document into given bands in an effort to enhance the scanning speed. For an A4 size document for example, the shuttle scanner module divides the document into twenty-four bands for scanning. When the multi-tasking system that uses a shuttle scanner module divides the information borne by the document into predetermined bands, the image data is segregated into discrete blocks. We have noticed that the occurrence of discontinuities in the blocked image data deteriorates the print quality.

SUMMARY OF THE INVENTION

Accordingly, it is an object of the present invention to provide a improve image formation process apparatus.

It is another object to provide a process and deviation correcting system able to correct deviations in image data read during scanning of the text of a document by a scanner incorporated into a multi-tasking system.

It is still another object to provide a process and apparatus able to compensate for the affects of deviations occurring during scanning of the text of a document by the expedient of controlling the number of slices to correct deviation of scanned data.

It is yet another object to provide a process and apparatus to correct deviations in an image deviation that may be caused when vertical scanning data is divided by bands while using a shuttle scanner module, according to the principles of the present invention, the data being shifted in block to the right or left in order to remove the non-uniformity, thus assuring the best possible print quality. The present invention is directed to a deviation correcting system for a scanner that substantially obviates one or more of the problems due to limitations and disadvantages of the related art.

It is still yet another object of the present invention to provide a multi-tasking system able to scan data borne by a document through a shuttle scanner module mounted on the multi-tasking system, and to remove any discontinuity in the data blocked by bands through the expedient of shifting to right or left, thus achieving smoothly printed data.

These and other objects may be attained with a process and apparatus to correct deviations in images that may be caused when vertical scanning data is divided by bands while using a shuttle scanner module. According to the principles of the present invention the data is shifted in block to the right or left in order to remove the non-uniformity, thus assuring the best possible print quality.

To achieve these and other advantages in accordance with the principles of the present invention, as embodied and broadly described, the present invention provides a deviation correcting system for a scanner including a central processing unit producing a control signal for reading a correction program stored to correct scanning deviations, generate a test pattern, print the test pattern, scan the printed test pattern, and correct scanning deviations attributable to the scanning. A print driver produces a control signal for printing the test pattern produced from the central processing unit and feeding the test pattern back to a scanning position. A printing unit prints the test pattern and then feeds the test pattern back to the scanning position upon application of the control signal from the print driver. An image processing unit producing a control signal for scanning the test pattern upon application of the control signal from the central processing unit, and a shuttle scanner module scans the test pattern and produces image data upon application of the control signal from the image processing unit.

According to another aspect of the present invention, a process and apparatus for correcting deviation created by a scanner includes the steps of printing a test pattern, scanning the printed test pattern, calculating a deviation degree in the scanned test pattern, establishing a direction of deviation when the deviation degree of the scanned test pattern is determined (e.g., as by approximation, gauge, measurement or calculation), and correcting the scanning deviation in response to a result of the direction of deviation.

It is to be understood that both the foregoing general description and the following detailed description are exemplary and explanatory and are intended to provide further explanation of the invention as claimed.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
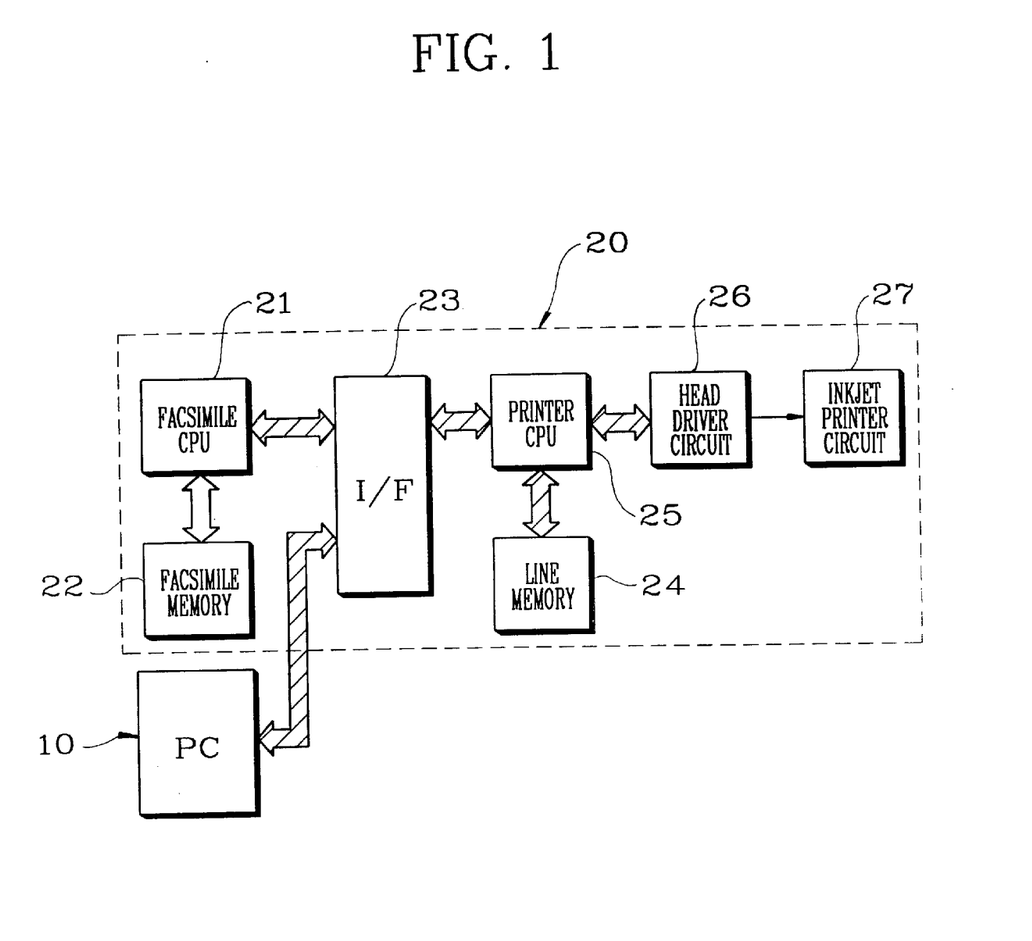
FIG. 1 is a block diagram of an internal circuit for a hypothetical conventional multi-tasking system.

Turning now to the drawings, a multi-tasking system employing an ink-jet printing mechanism able to serve as both a facsimile and a scanner, is described by reference to FIG. 1 of the drawings. FIG. 1 is a block diagram of an internal circuit for a hypothetical multi-tasking system 20.

As shown by FIG. 1, multi-tasking system 20 is coupled to personal computer (PC) 10 which performs a user-selected program and generates print data. Multi-tasking system 20 either receives the data output from personal computer (PC) 10 and the information transmitted from a source external to system 20, or scans data from one or more documents, and thus processes and prints images corresponding to the data on print media such as individual cut sheets of paper.

Multi-tasking system 20 is constructed with a facsimile central processing unit (CPU) 21 which receives and processes facsimile data and a facsimile memory 22 that temporarily stores the facsimile data from facsimile central processing unit (CPU) 21. An interface (I/F) 23 enables the facsimile data that is temporarily stored in facsimile memory 22, to be read under the control of facsimile central processing unit (CPU 21), and enables print data to be received from personal computer (PC) 10. Line memory 24 stores the facsimile data applied to interface 23. Printer central processing unit (CPU) 25 reads and processes the facsimile data stored in line memory 24. Head drive 26 produces a head control signal upon application of a control signal from printer central processing unit (CPU) 25; and an ink-jet print head 27 forms images with ink on print media corresponding to the data in response to application of the head control signal from head drive 26.

The following description relates to the operation of multi-tasking system 20. When a user generates print data while using personal processing unit (PC) 10, the print data is applied to printer central processing unit (CPU) 25 through interface 23. The print data received by interface 23 is processed by printer central processing unit (CPU) 25, which applies a printin control signal to head drive 26. Head drive 26 controls ink-jet print head 27 to spray ink particles onto the exposed surface of print media in response to application of the printing control signal. Ink-jet print head 27 sprays ink particles through a nozzle plate (not shown) perforated by a plurality of nozzles so as to form an image on the print media. The image is formed on the print media according to the print data generated by personal computer (PC) 10 in such a manner that the printing operation is carried out.

Facsimile central processing unit (CPU) 21 may receive either a facsimile signal from a telephone line or facsimile data read directly by scanning a document. Facsimile central processing unit (CPU) 21 transforms the applied facsimile data into another set of data suitable for the nozzle arrangement (not shown) of ink-jet print head 27. The facsimile data transformed by facsimile central processing unit (CPU) 21 is temporarily held in facsimile memory 22, and then applied to interface 23 under the control of facsimile central processing unit (CPU) 21. Facsimile data sent to interface 23 is stored in line memory 24 under the control of printer central processing unit (CPU) 25. Line memory 24 holds the data arranged to drive the number of nozzles of ink-jet print head 27.

The facsimile data held in line memory 24 is de-rasterized by printer central processing unit (CPU) 25. Printer central processing unit (CPU) 25, which de-rasterizes facsimile data, stored in line memory 24, produces a control signal for the printing of that facsimile data. The control signal, produced from printer central processing unit (CPU) 25, is applied to head drive 26 so that ink particles are ejected from print head 27 through the nozzles and onto the print media in order to print an image that corresponds to the facsimile data. This hypothetical, albeit conventional multi-tasking system may also include a scanner for reading the information recorded on the document by scanning of successive lines of the document. Laser scanning methods using the scanner include both sheetfed and flatbed laser scanning. With sheetfed laser scanning, while the scanner is in a fixed state, the document holding the information is moved in a vertical direction for laser scanning. With flatbed laser scanning, a laser beam is swept across a flat plate by a scanner modulated by video signals from a similar reading system or by digital signals generated by a computer. With sheetfed laser scanning techniques that are in common use, the scanning speed drops during continuous scanning. Moreover, the addition of a scanner for a sheetfed laser scanning unit significantly increases the size of a multi-tasking system. Recent efforts to solve this problem have proposed a shuttle scanner module mounted on one side of an ink-jet print head of an ink-jet printer, in an attempt to reduce the overall size of the multi-tasking system. The shuttle scanner module scans the document containing the information by dividing the text of the document into given bands in an endeavor to enhance the scanning speed. If the document is A4 paper for example, the shuttle scanner module divides it into twenty-four bands for scanning. A multi-tasking system employing a shuttle scanner module divides the document with the information into predetermined bands, thus blocking the image data. We have found that this deleteriously reduces the print quality because the blocking of the image creates a discontinuity in the blocked image data.

Figure 2:
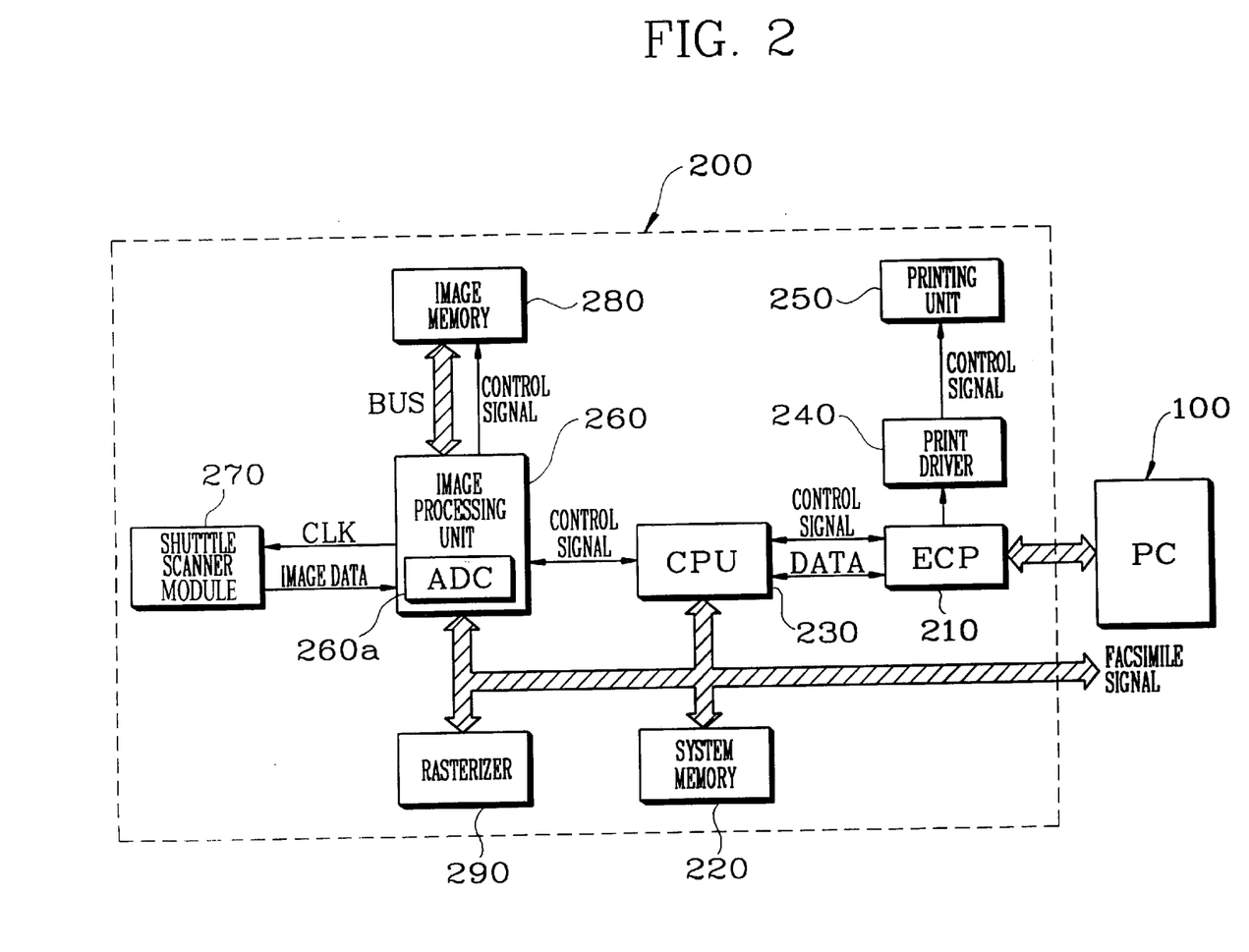
FIG. 2 is a block diagram of an internal circuit for a multi-tasking system constructed in accordance with the principles of the present invention.

Reference will now be made in detail to the preferred embodiments of the present invention, examples of which are illustrated in the accompanying drawings. Turning therefore, to FIG. 2, a block diagram illustrates an internal circuit for a multi-tasking system 200 constructed in accordance with the principles of the present invention.

The multi-tasking system includes a personal computer (PC) 100 which produces facsimile or print data in response to a facsimile signal or a user selected program; an extended capabilities part (ECP) 210 that implements input and output of data generated from personal computer (PC) 100 and multi-tasking system 200; a system memory 220 that stores a control program for multi-tasking system 200, initially set condition data, a deviation correcting program, and a test pattern 200a-1; a central processing unit (CPU) 230 which controls the overall operation of multi-tasking system 200 by reading out the data or program stored in system memory 220, produces a control signal upon application of facsimile or print data from extended capabilities part (ECP) 210, if a signal for correcting a scanning deviation is selected, for reading and printing the deviation correcting program and test pattern 200a-1 according to the selected signal, and then correcting the scanning deviation; and a print driver 240 which produces a control signal for printing out facsimile or print data or test pattern 200a-1 upon application of the control signal for facsimile or PC print data output from central processing unit (CPU) 230 or test pattern 200a-1, and for feeding it back to a scanning position.

The multi-tasking system also includes a printing unit 250 which prints out facsimile, print data, or test pattern 200a-1 upon application of the control signal from print driver 240, and feeds it back to the scanning position; an image processing unit 260 that processes a control signal for scanning the information in document 200a upon application of a scanning control signal from central processing unit (CPU) 230 or scanning test pattern 200a-1, printed by printing unit 250 and fed back, upon application of a scanning control signal test pattern 200a-1; a shuttle scanner module 270 which scans the information contained in document 200a or scans test pattern 200a-1 upon application of a control signal from image processing unit 260, thus producing image data; an image memory 280 that temporarily stores image data generated by shuttle scanner module 270 in response to the control signal of image processing unit 260; and a rasterizer 290 that rasterizes the image data, stored in image memory 280, under the control of image processing unit 260, and outputs the resultant data to print driver 240.

Image processing unit 260 has an analog-to-digital converter which converts the data scanned by shuttle scanner module 270 or image data produced by scanning test pattern 200a-1 into digital data.

Printing unit 250 has a line feed (LF) motor 250a which generates a rotating force used to feed document 200a or print media for printing out facsimile or print data thereon upon application of the control signal from print driver 240 or for feeding back test pattern 200a-1 to the scanning position after printing; an LF roller 250b which either feeds the print media or document 200a or feeds it back upon application of the rotating force from LF motor 250a; and a print head 250c that sprays ink particles for printing on the print media fed to LF roller 250b or for printing test pattern 200a-1 on document 200a.

Printing unit 250 also has shuttle scanner module 270 mounted on one side of print head 250c for scanning document 200a or test pattern 200a-1 printed on document 200a; a carriage return (CR) motor 250e providing the rotating force moving print head 250c or shuttle scanner module 270 to right or left in order to spray ink particles on document 200a or the print media; a time belt 250f transmitting the rotating force from CR motor 250e; a guide shaft 250d which guides print head 250c and shuttle scanner module 270 moved to right or left by time belt 250f; and a shuttle position sensor 250g that senses the position of shuttle scanner module 270.

Figure 4:
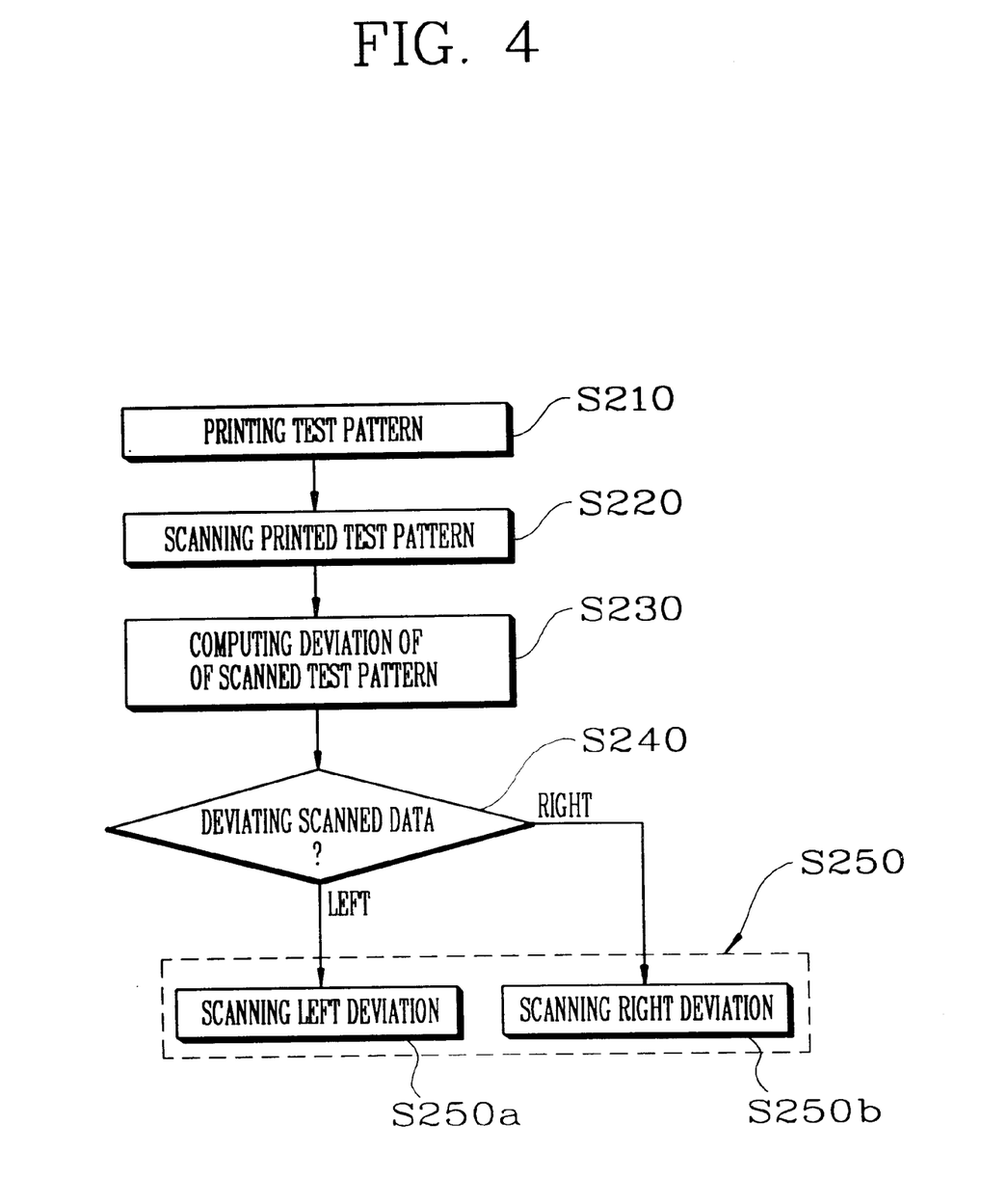
FIG. 4 depicts the control sequence of deviation correction through scanning in accordance with the principles of the present invention.

Turning now to FIG. 4, the following description relates to the deviation correcting program stored in system memory 220 of multi-tasking system 200. The control sequence of deviation correction in accordance with the present invention, includes the steps of printing (S210) test pattern 200a-1 stored in system memory 220 (FIG. 2); once test pattern 200a-1 has been printed out, scanning (S220) test pattern 200a-1; calculating (S230) a deviation degree of scanned test pattern 200a-1; determining (S240) a direction in which test pattern 200a-1 is deviated; and correcting (S250) the scanning deviation in response to the result.

Step S250 includes sub-steps of correcting (S250a) the left deviation if scanned test pattern 200a-1 is deviated to left during scanning in step S240; and correcting (S250b) the right deviation if scanned test pattern 200a-1 is deviated to right during scanning in step S240.

The following detailed description concerns the deviation correcting process. PC 100 applies print data and facsimile data to CPU 230 through extended capabilities part (ECP) 210 upon receipt of a facsimile signal sent from the outside, and extended capabilities part (ECP) 210 is used as a parallel interface module for two-way communication. CPU 230 lets rasterizer 290 rasterize the applied facsimile data, and applies the resterized data to print driver 240. The print data, applied to CPU 230 of multi-tasking system 200, is also transmitted to print driver 240.

Print driver 240 produces a print head fire/enable control signal, a CR (i.e., carriage return) motor phase/position control signal, or a print data handling/LF (i.e., line feed) motor control signal upon application of the facsimile data or print data. Each control signal, output from print driver 240, is received from printing unit 250. Printing unit 250 feeds the print media with LF roller 250b, controlled by LF motor 250a, upon application of one of various control signals. Feeding the print media follows the printing operation with respect to data applied through print head 250c under the control of CR motor 250e and time belt 250f. Print head 250c sprays ink particles on the moving print media, directed by a guide shaft 250d, to right or left, thus forming an image on the print media corresponding to the facsimile data or print data.

Document 200a is moved to an initial scanning position of shuttle scanner module 270 mounted on one side of print head 250d and using guide shaft 250d as a shaft for lateral shift. Shuttle scanner module 270 scans document 200a moved to its initial scanning position.

A charge coupled device (CCD) used for shuttle scanner module 270 is of 128-dot size, and document 200a of A4 (2551×2507; 300 DPI) is divided into 27 blocks for scanning. Thus, in order to scan one block shuttle scanner module 270, after scanning one vertical line, shifts horizontally, and then scans one vertical line. Shuttle scanner module 270's horizontal and vertical shifts are made by LF motor 250a and CR motor 250e. Shuttle scanner module 270 scans 27 blocks divided to scan A4 document 200a.

The image data scanned by shuttle scanner module 270 is converted into digital data by ADC 260a of image processing unit 260. Image processing unit 260 corrects the image data in shading, gamma correction, dot per inch (DPI) conversion, edge emphasis, error diffusion, etc. The image data, converted into digital data by image processing unit 260, is rasterized by rasterizer 290 and temporarily stored in image memory 280. Image memory 280 is used as a temporary buffer. The image data rasterized by rasterizer 290 and stored in image memory 280 is transmitted to print driver 240 or PC 100 through ECP 210 under the control of CPU 230. The data, sent to print driver 240, is re-printed out by printing portion 250, and If the data is transmitted to PC 100, it is stored through PC 100 or processed by a given program for storing.

The data is shifted by the arrow indicative of an address and data bus, and shuttle scanner module 270 scans document 200a under the control of a clock CLK from image processing unit 260. If a signal is applied to CPU 230 through selection means (not shown) for checking or correcting shuttle scanner module 270's deviation according to a user's selecting one of the general functions of multitasking system 200, CPU 230 executes the deviation correcting program upon application of the signal by loading this program from system memory 220. According to this program, CPU 230 performs step S210 first. After loading test pattern 200a-1 from system memory 220, CPU 230 transmits that pattern to print driver 240 through ECP 210.

Figure 3:
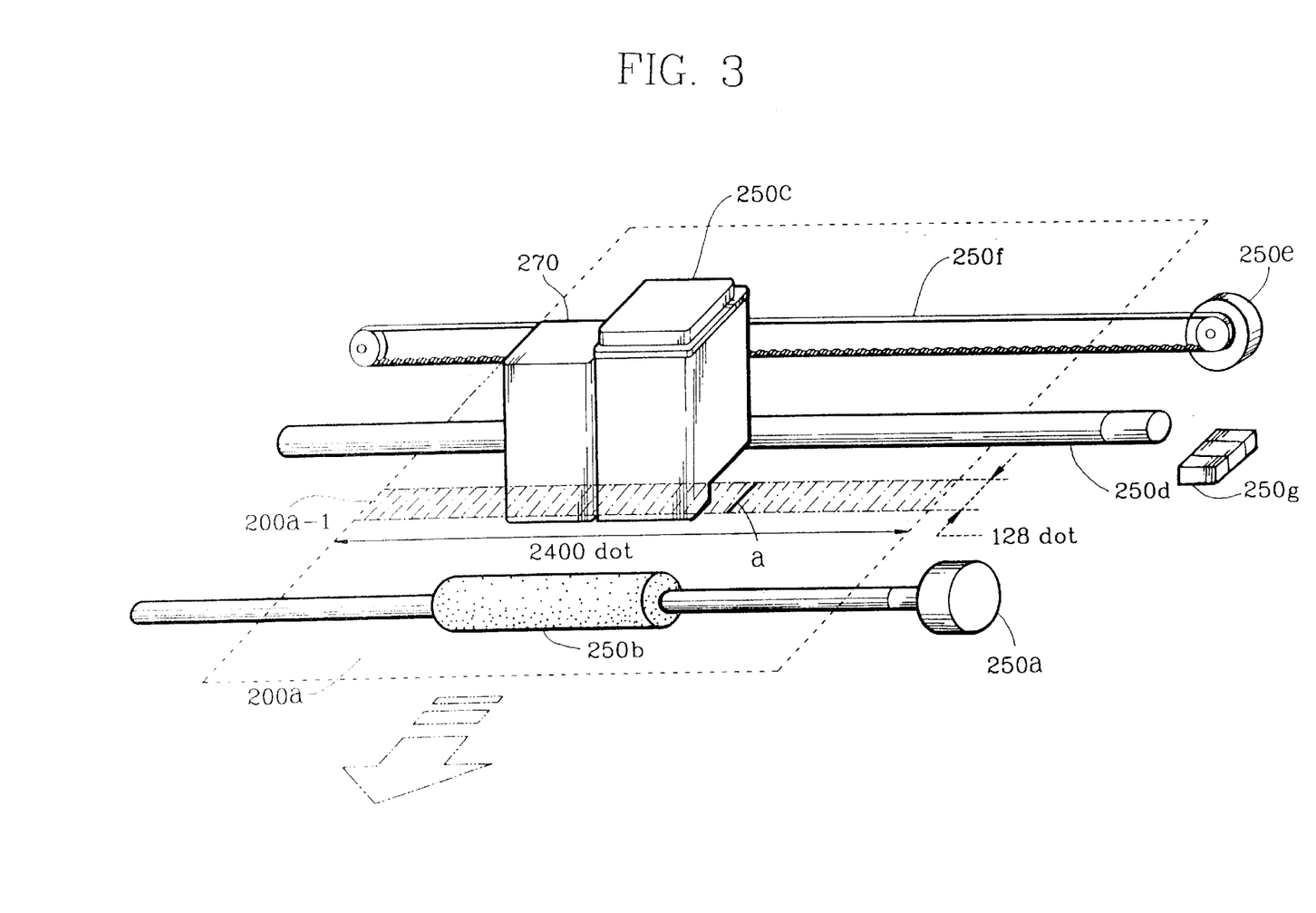
FIG. 3 depicts a scanning region of a scanner mounted on the inventive multi-tasking system.

Print driver 240 sends a print control signal to printing unit 250 upon application of test pattern 200a-1 from CPU 230. Printing unit 250 prints out test pattern 200a-1, as shown in FIG. 3, by the use of ink particles from print head 250c upon receipt of the print control signal. When test pattern 200a-1 is printed on the print media by print head 250c, shuttle scanner module scans document 200a with printed test pattern 200a-1 through step S220. If completing the printing operation to scan document 200a with test pattern 200a-1, document 200a is fed back by LF roller 250b turned reversely by LF motor 250a. That is, test pattern 200a-1 of document 200a is fed back to the initial scanning position of shuttle scanner module 270, and scanned by shuttle scanner module 270.

Test pattern 200a-1 scanned by shuttle scanner module 270 is converted into digital data, thus producing image data under the control of image processing unit 260. The image data is stored in image memory 280 through address and data bus under the control of image processing unit 260. If the image data is completely stored in image memory 280, CPU 230 executes step S230. In this step S230 an interval of adjacent dots in a predetermined spot of test pattern 200a-1 is calculated. A value of tilt is calculated from the interval of dots, and dot averages in the range of the calculated value of tilt are compared to compute a deviation degree of the scanned image data.

If computing the deviation degree of the scanned image data, CPU 230 determines if the scanned data is deviated to right or left in step S240. When the data is deviated to left, CPU 230 executes step S250a, thus correcting the image data's deviation to left during scanning. In addition, if CPU 230 determines (S240) that the scanned data is deviated to right, it executes step S250b, thus correcting the image data's deviation to right during scanning. The deviation correcting process in step S250 is carried out by clock CLK applied to shuttle scanner module 270, which is described in more detail with reference to the drawings.

Figure 5:
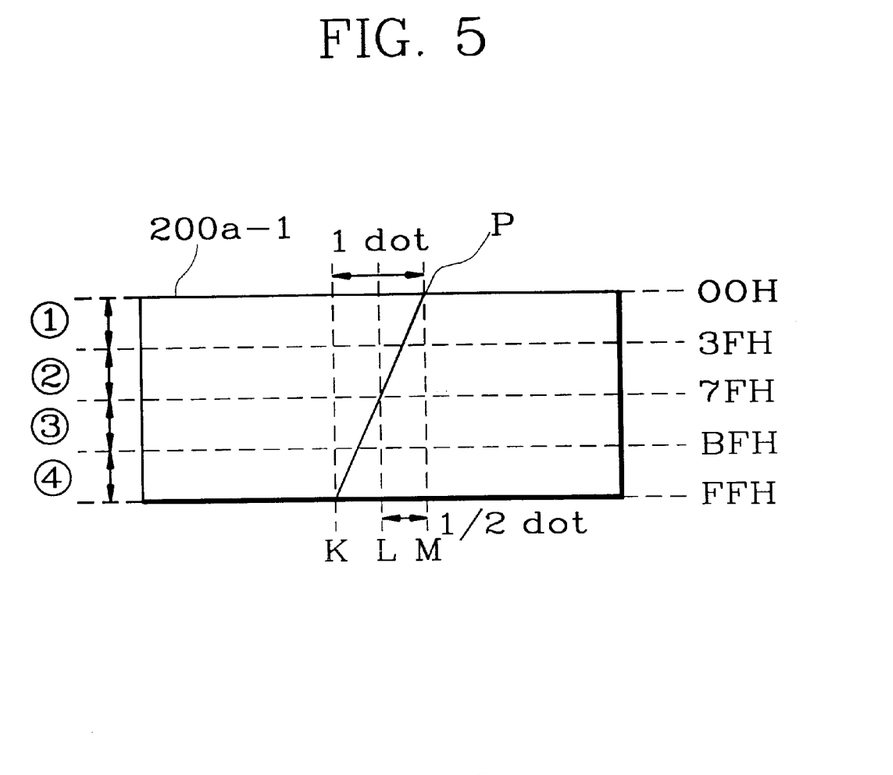
FIG. 5 depicts a process of correcting a left deviation in accordance with the principles of the present invention.

FIG. 5 depicts a process of correcting one-dot deviation between a first dot and a 128th dot within a single slice ("a" of FIG. 3). As shown in FIG. 5, each of the first dot and the 128th dot is divided into 32 dots and converted into 8-bit analog-to-digital converter (ADC) 260a (FIG. 2), thus having 256 values. The state 256 values 16 is expressed in a hexadecimal number and divided into 00H to FFH.

Step S230 includes the sub-steps of finding an average on the basis of the last dot in a second section 2 of quartered test pattern 200a-1 and calculating a deviation degree; finding an average on the basis of the last dot in a third section 3 of quartered test pattern 200a-1 and calculating a deviation degree; finding an average on the basis of the last dot in a fourth section 4 of quartered test pattern 200a-1 and calculating a deviation degree; finding an average on the basis of the last dot in a first section 1 of quartered test pattern 200a-1 and calculating a deviation degree; and finding an average on the basis of the last dot in a half part of first section 1 of quartered test pattern 200a-1 and calculating a deviation degree.

In the second sub-step, an average of ±2 dot is obtained on the basis of a 64th dot, the last dot in second section 2. When the average of ±2 dot is obtained:

1. in case of $00H \leq average \leq 44H$, the comparison with third section 3 is executed;
2. in case of $45H \leq average \leq 83H$, there is a 1-dot deviation overall;
3. in case of $84H \leq average \leq C3H$, there is a 1.5-dot deviation overall;
4. in case of $C4H \leq average \leq EAH$, there is a 2 dot-deviation overall; and
5. in case of $EBH \leq average \leq FFH$, the comparison with first section 1 is executed;

Respective values of the overall 1-dot deviation in case 1, the overall 1.5-dot deviation in case 2, and the overall 2-dot deviation in case 3, are stored in system memory 220. Once the values of the dot deviation are completely stored in system memory 220, an average is obtained on the basis of the last dot of second section 2, and the other dots are compared with the average in size, thus finding a deviation degree. And in response to a result of case 1, an average is obtained on the basis of the last dot in third section 3, and the other dots are compared with the average to get a deviation degree. An average of ±2 dot is obtained on the basis of the last dot, 96th dot of third section 3. Once the average of ±2 dot is obtained on the basis of the last dot, 6. in case of 00H≦average≦44H, the comparison with the fourth section 4 is made;
7. in case of 45H≦average≦83H, the overall 0.75 dot-deviation is determined;
8. in case of 84H≦average≦C3H, the overall 1 dot-deviation is determined;
9. in case of C4H<average<EAH, the overall 1.25 dot-deviation is determined; and
10. in case of EBH≦average≦FFH, the comparison with first section 1 is made.

Respective values of the overall 0.75-dot deviation in case 7, the overall 1-dot deviation in case 8, and the overall 1.25-dot deviation in case 9, are stored in system memory 220. Once the values of the dot deviation are completely stored in system memory 220, an average is obtained on the basis of the last dot of third section 3, and the other dots are compared with the average in size, thus finding a deviation degree. And in response to a result of case 6 an average is obtained on the basis of the last dot in fourth section 4, and the other dots are compared with the average to get a deviation degree. An average of ±2 dot is obtained on the basis of the last dot, 128th dot of fourth section 4. Once the average of ±2 dot is obtained on the basis of the last dot, 11. in case of 00H≦average≦44H, no deviation is determined;
12. in case of 45H≦average≦83H, no deviation is determined;
13. in case of 84H≦average≦C3H, the overall 0.75 dot-deviation is determined;
14. in case of C4H≦average≦EAH, the overall 1 dot-deviation is determined; and
15. in case of EBH≦average≦FFH, the comparison with first section 1 is made.

The result with no deviation in case 12, and respective values of the overall 0.75-dot deviation in case 13, and the overall 1-dot deviation in case 1 are stored in system memory 220. Once values of the dot deviation are stored in system memory 220, an average is obtained on the basis of the last dot in first section 1 in response to the respective results of cases 5, 10 and 15, thus obtaining a deviation degree.

An average of ±2 dot is obtained on the basis of the last dot, a 32nd dot, in first section 1. Once the average of −10 dot is obtained on the basis of the 32nd dot;

16. in case of 45H≦average≦83H, the overall 2-dot deviation is determined;
17. in case of 84H≦average≦C3H, the overall 3-dot deviation is determined;
18. in case of C4H≦average≦EAH, the overall 4-dot deviation is determined; and
19. in case of EBH≦average23 FFH, the comparison with a half part of first section 1 is made.

Respective values of the overall 2-dot deviation in case 16, the overall 3-dot deviation in case 17, and the overall 4-dot deviation in case 18, are stored in system memory 220. Once the values of the dot deviation are completely stored in system memory 220, an average is obtained on the basis of the last dot of first section 1, and the other dots are compared with the average in size, thus finding a deviation degree. In response to a result of case 18, an average is obtained on the basis of the last dot in first section 1, and the other dots are compared with the average to obtain a deviation degree.

An average of ±2 dot is obtained on the basis of the last dot, a 16th dot, in a half part of first section 1. Once the average of ±2 dot is obtained on the basis of the last dot:

20. in case of average≦83H, the overall 4-dot deviation is determined; and
21. in case of 84H≦average, CPU 230 interprets it as a test fail to control shuttle scanner module 270.

Test pattern 200a-1 is scanned through the steps, and a deviation value is calculated by using the scanned image data. If finding a deviation value through step S230 of scanned test pattern 200a-1, CPU 230 determines (step S240) if scanned test pattern 200a-1 is deviated to right or left. If CPU 230 determines (step S240) that an average of 238 dots in test pattern 200a-1 equals FFH, it sets a reference value so as to determine that test pattern 200a-1 is deviated to right. If CPU 230 determines that it is deviated to left by using the reference value, it executes step S250a to correct the left deviation.

Figure 6:
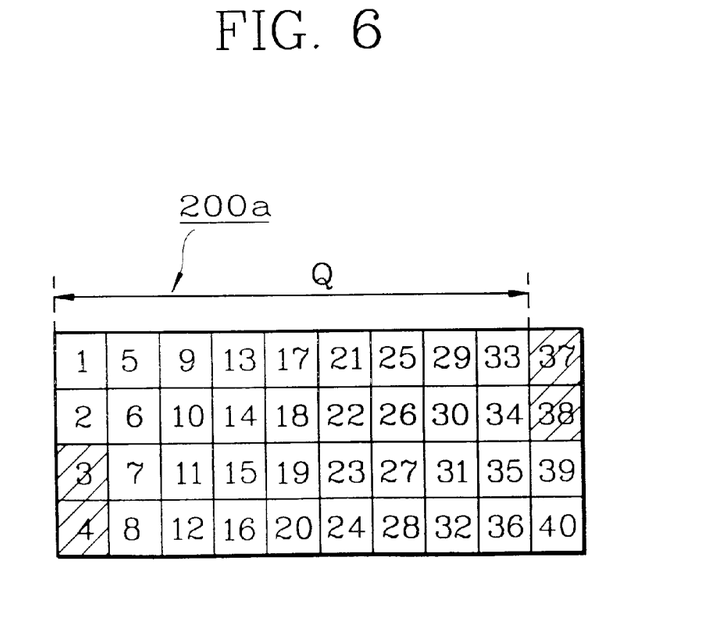
FIG. 6 is a data block diagram prior to correcting the left deviation of FIG. 5.
Figure 7:
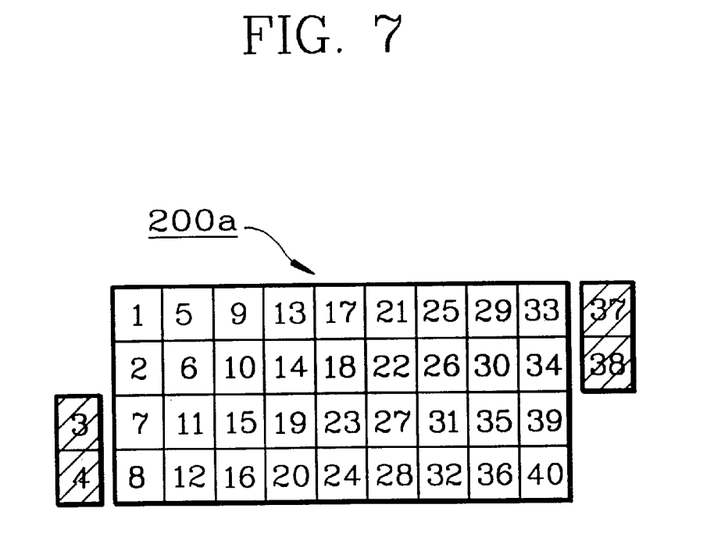
FIG. 7 is a data block diagram after correcting the left deviation of FIG. 5.

If CPU 230 determines (S230) that scanned test pattern 200a-1 is deviated to one-dot left, shaded data blocks 3, 4, 37 and 38 are moved to right for correction in order to scan data blocks 1 to 40 within a range of a length Q of document 200a to be actually scanned (FIG. 6). Shaded data blocks 3, 4, 37 and 38 are scanned to correct the deviation, as shown in FIG. 7. If CPU 230 determines (S240) that scanned test pattern 200a-1 is deviated to right, it executes step S250b.

Figure 8:
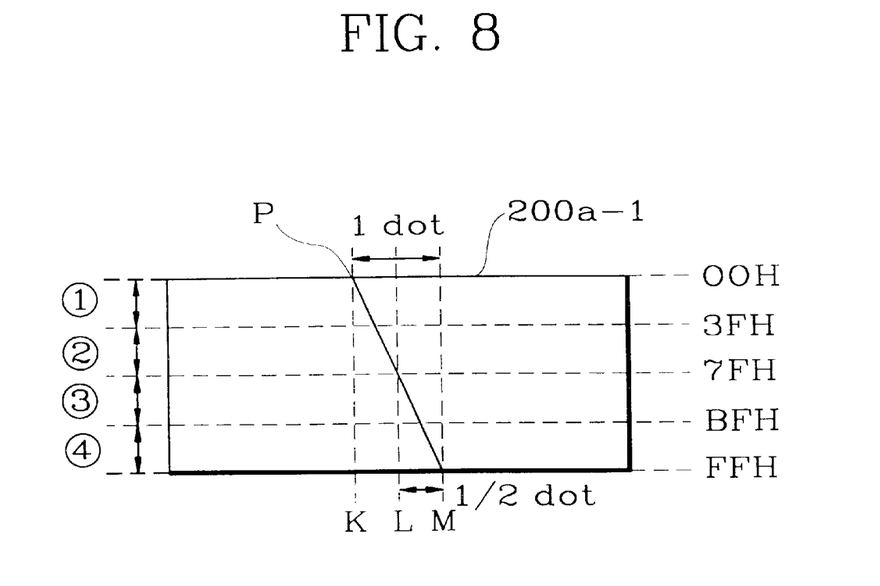
FIG. 8 depicts a process of correcting a right deviation in accordance with the principles of the present invention.

As shown in FIG. 8, if there is a deviation to right, a deviation degree is obtained through s cases 1 to 20. If CPU 230 determines that test pattern 200a-1 is deviated to one-dot right through cases 1 to 20, shaded data blocks 1, 2, 39 and 40 are moved to left for correction in order to scan data blocks 1 to 40 held in document 200a of FIG. 9, which is shown in FIG. 7.

Figure 9:
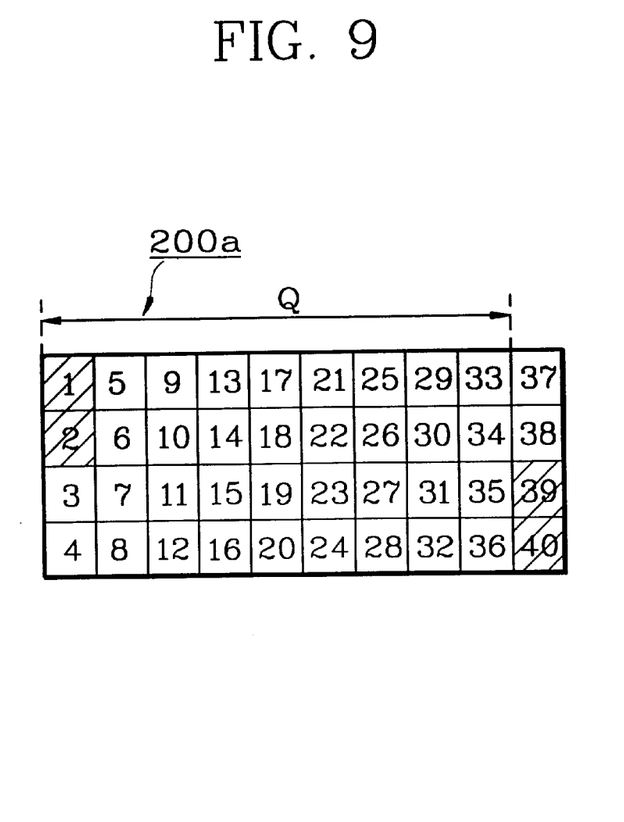
FIG. 9 is a data block diagram prior to correcting the right deviation of FIG. 8.
Figure 10:
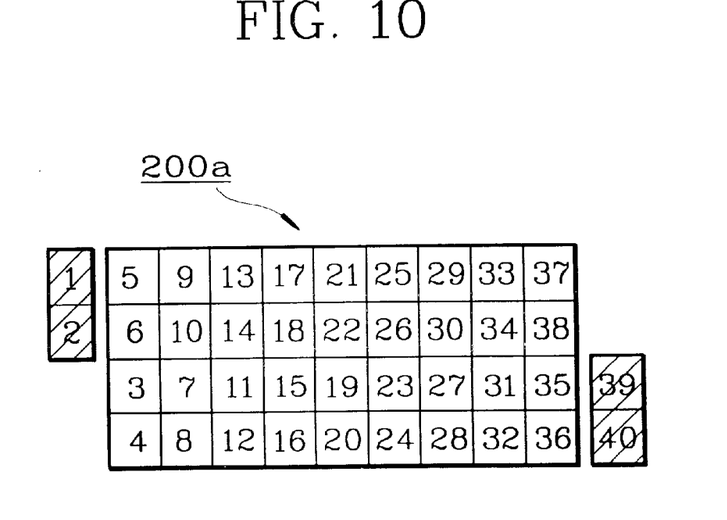
FIG. 10 is a data block diagram after correcting the right deviation of FIG. 8.

As shown in FIGS. 6 and 7, if it is deviated to left, data corresponding to a 128th dot to a 64th dot of lower part are shifted to right for correction. That is, one slice is further scanned at a scanning finishing point. When it is deviated to right, as shown in FIGS. 9 and 10, a data block from the 128th dot to a 64th dot of upper part within length Q of document 200a is shifted to left one slice is moved for correcting the deviation in such a manner that the scanning deviation, resulting from irregularly scanning with the shuttle scanner module, can be corrected.

The foregoing paragraphs describe a process and deviation correcting system able to correct scanning deviation in a scanner configured into a multi-tasking system, by the expedient of controlling the number of slices to correct deviation of scanned data. In order to correct an image deviation that may be caused when vertical scanning data is divided by bands while using a shuttle scanner module, according to the principles of the present invention the data is shifted in block to the right or left in order to remove the non-uniformity, thus assuring the best possible print quality. It will be apparent to those skilled in the art that various modifications and variations can be made in the deviation correcting system for a scanner of the present invention without departing from the spirit or scope of the invention. Thus, it is intended that the present invention cover the modifications and variations of this invention provided they come within the scope of the appended claims and their equivalents.

What is claimed is:

1. An alignment error correcting apparatus for a scanner, the apparatus comprising:
   a central processing unit generating a first control signal, said first control signal corresponding to an execution of a correcting routine correcting scanning alignment error, a reading of a test pattern, a recording of the test pattern on a recordable medium, a scanning of the test pattern when the test pattern is recorded on the recordable medium, and a correcting of a scanning alignment error;

a print driver unit being coupled to said central processing unit, generating a second control signal, said second control signal corresponding to the recording of the test pattern on the recordable medium, and corresponding to a feeding of the recordable medium bearing the test pattern to a predetermined scanning position;

a printing unit being coupled to said print driver, receiving said second control signal from said print driver, recording the test pattern on the recordable medium in response to said second control signal, and then performing the feeding of the recordable medium bearing the test pattern to the predetermined scanning position in response to said second control signal;

an image processing unit being coupled to said central processing unit, generating a third control signal in response to said first control signal, said third control signal corresponding to the scanning of the test pattern recorded on the recordable medium; and a shuttle scanner unit being coupled to said image processing unit, scanning the test pattern recorded on the recordable medium and producing first image data in response to said third control signal, the first image data corresponding to the test pattern recorded on the recordable medium.

2. The apparatus of claim 1, further comprising a system memory unit storing the correcting routine and the test pattern, said system memory unit being coupled to said central processing unit.

3. The apparatus of claim 1, further comprising an image memory unit storing the first image data produced by the shuttle scanner unit in response to said third control signal, said image memory unit being coupled to said image processing unit.

4. An alignment error correcting method for a scanner, comprising the steps of:
recording a test pattern on a recordable medium, the test pattern including a plurality of units of printing media recorded on the recordable medium, said plurality of units of the printing media corresponding to a plurality of dots of the printing media;

scanning the test pattern recorded on the recordable medium;

first calculating a magnitude of an alignment error of the scanned test pattern;

determining a direction of the alignment error when the magnitude of the alignment error of the scanned test pattern is calculated; and correcting the alignment error in accordance with the determined direction of the alignment error, said plurality of dots further comprising:
a first section of said plurality of dots, said first section having a last dot selected from among said first section of said plurality of dots;
said first section having a first half part and a second half part, said first half part having a last dot selected from among said first section of said plurality of dots, and said second half part having a last dot selected from among said first section of said plurality of dots;
a second section of said plurality of dots, said second section having a last dot selected from among said second section of said plurality of dots;
a third section of said plurality of dots, said third section having a last dot selected from among said third section of said plurality of dots; and
a fourth section of said plurality of dots, said fourth section having a last dot selected from among said fourth section of said plurality of dots.

5. The method of claim 4, wherein said first calculating step further comprises the substeps of:
calculating a second section value corresponding to said last dot of said second section and calculating the magnitude of the alignment error;
calculating a third section value corresponding to said last dot of said third section and calculating the magnitude of the alignment error;
calculating a fourth section value corresponding to said last dot of said fourth section and calculating the magnitude of the alignment error;
calculating a first section value corresponding to said last dot of said first section and calculating the magnitude of the alignment error; and
calculating a first half part value corresponding to said last dot of said first half part and calculating the magnitude of the alignment error.

6. The method of claim 4, wherein said correcting step further comprises the substeps of:
when the determined direction of the alignment error is a left direction, correcting a left deviation; and
when the determined direction of the alignment error is a right direction, correcting a right deviation.

7. The method of claim 6, wherein, in said substep of correcting the left deviation, data blocks are shifted to the right direction correcting the left deviation.

8. The method of claim 6, wherein, in said substep of correcting the right deviation, data blocks are shifted to the left direction correcting the right deviation.

9. The method of claim 4, said recording being controlled by a central processing unit.

10. The method of claim 4, said scanning being controlled by a central processing unit.

11. The method of claim 4, wherein said calculating step further comprises the substeps of:
calculating a second section value corresponding to said last dot of said second section and calculating the magnitude of the alignment error;
calculating a third section value corresponding to said last dot of said third section and calculating the magnitude of the alignment error;
calculating a fourth section value corresponding to said last dot of said fourth section and calculating the magnitude of the alignment error;
calculating a first section value corresponding to said last dot of said first section and calculating the magnitude of the alignment error; and
calculating a second halfpart value corresponding to said last dot of said second halfpart and calculating the magnitude of the alignment error.

12. The method of claim 4, wherein said correcting step further comprises the substeps of:
when the determined direction of the alignment error is a first direction, correcting the alignment error in the first direction; and
when the determined direction of the alignment error is a second direction, correcting the alignment error in the second direction, the second direction being opposite to the first direction.

13. The method of claim 12, wherein said substep of correcting the alignment error in the first direction further comprises shifting data blocks in the second direction.

14. The method of claim 12, wherein said substep of correcting the alignment error in the second direction further comprises shifting data blocks in the first direction.

15. An error correcting apparatus for a scanner device, the apparatus comprising:

a central processing unit executing a correcting routine correcting scanning alignment errors, reading a test pattern, recording the test pattern on a recordable medium, scanning the test pattern when the test pattern is recorded on the recordable medium, correcting a detected scanning alignment error, and transmitting a first control signal and a second control signal;

a print driver unit being coupled to said central processing unit, receiving said first control signal, transmitting a third control signal in response to said first control signal, controlling the recording of the test pattern on the recordable medium, and controlling a feeding of the recordable medium bearing the test pattern to a predetermined scanning position;

an ink-jet printing unit being coupled to said print driver, receiving said third control signal from said print driver, and recording the test pattern on the recordable medium and then performing the feeding of the recordable medium bearing the test pattern to the predetermined scanning position in response to said third control signal;

an image processing unit being coupled to said central processing unit, receiving said second control signal, transmitting a fourth control signal in response to said second control signal, and controlling the scanning of the test pattern recorded on the recordable medium;

a scanner unit being coupled to said image processing unit, receiving said fourth control signal, scanning the test pattern recorded on the recordable medium and generating first image data in response to said fourth control signal, the first image data corresponding to the test pattern recorded on the recordable medium; and said central processing unit correcting the detected scanning alignment error by shifting blocks of data in a correction direction opposite to an error direction, said error direction corresponding to the detected scanning alignment error.

16. The apparatus of claim 15, further comprising a system memory unit storing the correcting routine and the test pattern, said system memory unit being coupled to said central processing unit.

17. The apparatus of claim 15, further comprising an image memory unit storing the first image data generated by the scanner unit, said image memory unit being coupled to said image processing unit.

18. The apparatus of claim 15, wherein the correcting of the detected scanning alignment error performmned by said central processing unit comprises the steps of:

determining the direction of the detected scanning alignment error;

when the determined direction of the alignment error is a left direction, correcting a left deviation; and when the determined direction of the alignment error is a right direction, correcting a right deviation.

19. The apparatus of claim 18, wherein said step of correcting the left deviation corresponds to a shifting of data blocks to the right direction correcting the left deviation.

20. The apparatus of claim 18, wherein said step of correcting the right deviation corresponds to a shifting of data blocks to the left direction correcting the right deviation.

* * * * *